(12) United States Patent
LeBlanc, Sr. et al.

(10) Patent No.: US 7,762,372 B2
(45) Date of Patent: Jul. 27, 2010

(54) WHEEL UNIT FOR AUTOMOTIVE VEHICLES

(75) Inventors: James C. LeBlanc, Sr., Rochester, MI (US); James C. LeBlanc, Jr., Washington, MI (US); Paul D. Bentley, Rochester, MI (US)

(73) Assignee: GPV, LLC, Southfield, MI (US)

( * ) Notice: Subject to any disclaimer, the term of this patent is extended or adjusted under 35 U.S.C. 154(b) by 617 days.

(21) Appl. No.: 10/969,909

(22) Filed: Oct. 22, 2004

(65) Prior Publication Data

US 2005/0073122 A1 Apr. 7, 2005

Related U.S. Application Data

(63) Continuation-in-part of application No. PCT/US03/31228, filed on Oct. 3, 2003.

(51) Int. Cl.
*B60K 17/30* (2006.01)
(52) U.S. Cl. .................. 180/385; 180/253; 152/415; 384/544
(58) Field of Classification Search ............ 280/93.512, 280/93.51, 93.511, 124.157, 124.135, 124.126; 180/348, 385, 370, 253, 254; 152/415, 416; 384/571, 544
See application file for complete search history.

(56) References Cited

U.S. PATENT DOCUMENTS

| | | | | |
|---|---|---|---|---|
| 2,734,786 A | * | 2/1956 | McNicoll | 384/447 |
| 3,361,501 A | * | 1/1968 | Messinger et al. | 384/620 |
| 4,271,922 A | * | 6/1981 | Kishline | 180/254 |
| 4,667,760 A | * | 5/1987 | Takimoto | 180/215 |
| 4,795,277 A | * | 1/1989 | Colanzi | 384/447 |
| 4,844,505 A | * | 7/1989 | Higuchi | 280/124.145 |
| 4,915,513 A | * | 4/1990 | Orain | 384/447 |
| 4,995,633 A | * | 2/1991 | Santo | 280/124.146 |
| 5,915,727 A | * | 6/1999 | Bonnville | 280/788 |
| 5,938,219 A | * | 8/1999 | Hayami et al. | 280/124.135 |
| 6,116,626 A | * | 9/2000 | Cherry et al. | 280/124.135 |
| 6,148,945 A | * | 11/2000 | Alessandro et al. | 180/256 |
| 6,238,095 B1 | * | 5/2001 | Ai | 384/450 |
| 6,325,123 B1 | * | 12/2001 | Gao et al. | 152/416 |
| 6,390,221 B2 | * | 5/2002 | Goddard et al. | 180/247 |
| 6,668,888 B1 | * | 12/2003 | Beesley et al. | 152/417 |
| 6,729,633 B1 | * | 5/2004 | Irwin | 280/86.75 |

* cited by examiner

*Primary Examiner*—Paul N. Dickson
*Assistant Examiner*—George D. Spisich
(74) *Attorney, Agent, or Firm*—Novak Druce + Quigg LLP

(57) ABSTRACT

A wheel assembly for a vehicle having a body, a power plant and a drivetrain for transmitting drive to said wheel assembly, generally consisting of a wheel including rim and hub portions; a roller bearing having inner and outer races, disposed within the rim portion of the wheels, coaxially therewith; first support means having a steering axis, mounted on the outer race of the bearing connectable to the body; second support means mounted to the inner race of the bearing and rigidly secured to the hub portion of the wheel; and an axle operatively connected at an inner end thereof to a portion of the drivetrain and an outer end extending into the inner race of the bearing and connected by means of a single universal joint to one of the second support means and the hub portion of the vehicle; wherein the steering axis intersects the center of the single universal joint.

18 Claims, 8 Drawing Sheets

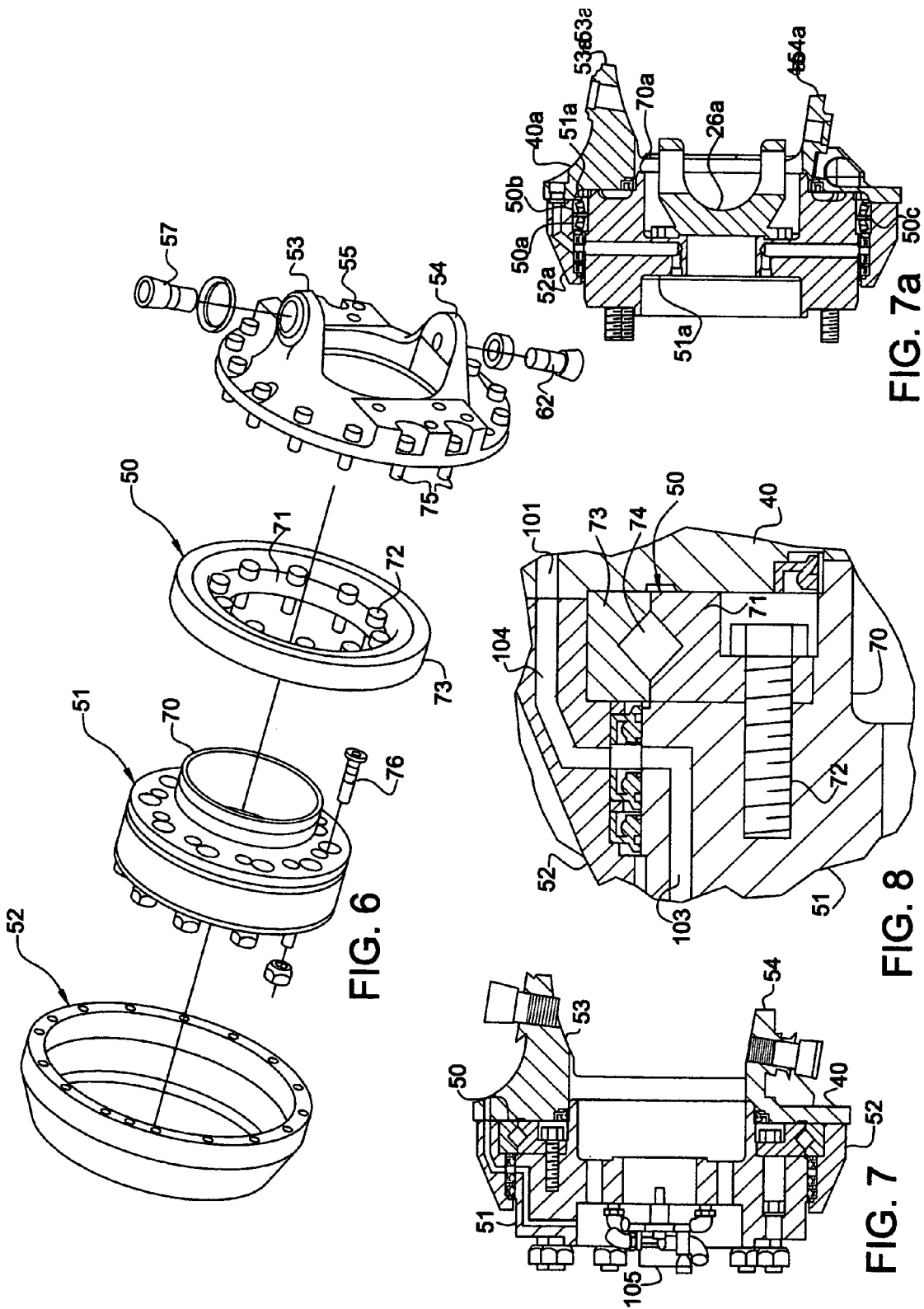

WHEEL UNIT FOR AUTOMOTIVE VEHICLES

This invention relates to an automotive vehicle and more particularly to an improved wheel unit for such a vehicle. The invention further contemplates a novel wheel suspension system forming a component of such unit. This application is a continuation-in-part of PCT Application No. PCT/US03/31228 filed Oct. 3, 2003, which is incorporated herein by reference.

BACKGROUND OF THE INVENTION

In the prior art, there has been developed a certain type of vehicle designed for a variety of purposes, generally consisting of a body mounted on a set of wheel units, a power plant mounted in the vehicle body, a drivetrain for transmitting drive from the power plant to the wheel units, a steering system operatively connected to one or more of the wheel units and, often, various auxiliary systems. Because such vehicles are intended to carry an operator, often additional personnel and/or cargo or additional equipment, it is desirable that the compartment space of such vehicles be as large as possible. The mounting and installation of such required units and systems, however, has the effect of intruding upon and thus diminishing the compartment space of such vehicles.

In addition to requiring maximum compartment space, it is desirable that such vehicles be effectively mobile and maneuverable in operation. They must be capable of operating on both ordinary roadways and offroad terrain. They further must be capable of being operated on irregular and sloped terrain and to do so by maintaining as near a level bearing of the vehicle body as possible in order to maintain vehicle control and operate the various systems of the vehicle.

In view of the foregoing requirements of such vehicle, it is the principal object of the present invention to provide a wheel unit for the type of vehicle described which provides all wheel drive for such vehicles, maximum jounce and rebound for negotiating irregular and sloped terrain and minimal intrusion upon the body of the vehicle in order to provide maximum compartment space.

SUMMARY OF THE INVENTION

The present invention achieves its principal objective by providing a wheel unit generally consisting of a wheel including rim and disc portions, upper and lower control arms universally connected to the body of the vehicle, a knuckle plate universally connected to the outer ends of the upper and lower control arms, a roller bearing disposed within the rim portion of the wheel coaxially therewith having an outer race mounted on the knuckle plate and an inner race, a hub member mounted on the inner race of the bearing and rigidly connected to the disc portion of the wheel and a half shaft operatively connected at an inner end to a component of the vehicle drivetrain and an outer end extending through the bearing and connected to the hub member for rotational drive therewith. The bearing is adapted to carry axial, radial and moment loads. The outer end of the half shaft is provided with a Cardan or universal joint disposed within the rim portion of the wheel, and the kingpin axis of the knuckle plate intersects a midpoint of the Cardan joint of the half shaft and includes a portion disposed within the rim portion of the wheel. With such a configuration, the wheel is capable of increased jounce and rebound with correspondingly minimal angularity of the half axle, and may be steered through a minimal steering angle to provide a minimal turning angle without intruding upon the body of the vehicle and thus providing a maximum compartment space for the vehicle.

BRIEF DESCRIPTION OF THE DRAWINGS

FIG. 6 is an exploded view of the axle end assembly utilized in the wheel unit shown in FIGS. 1 through 5;

FIG. 7 is a vertical cross-sectional view of the assembly shown in FIG. 6, assembled;

FIG. 7a is a view similar to the view shown in FIG. 7, illustrating another embodiment of the axle end assembly;

FIG. 8 is an enlarged, fragmentary view of a portion of the assembly shown in FIG. 7;

DETAILED DESCRIPTIONS OF EMBODIMENTS OF THE INVENTION

Figure 1:
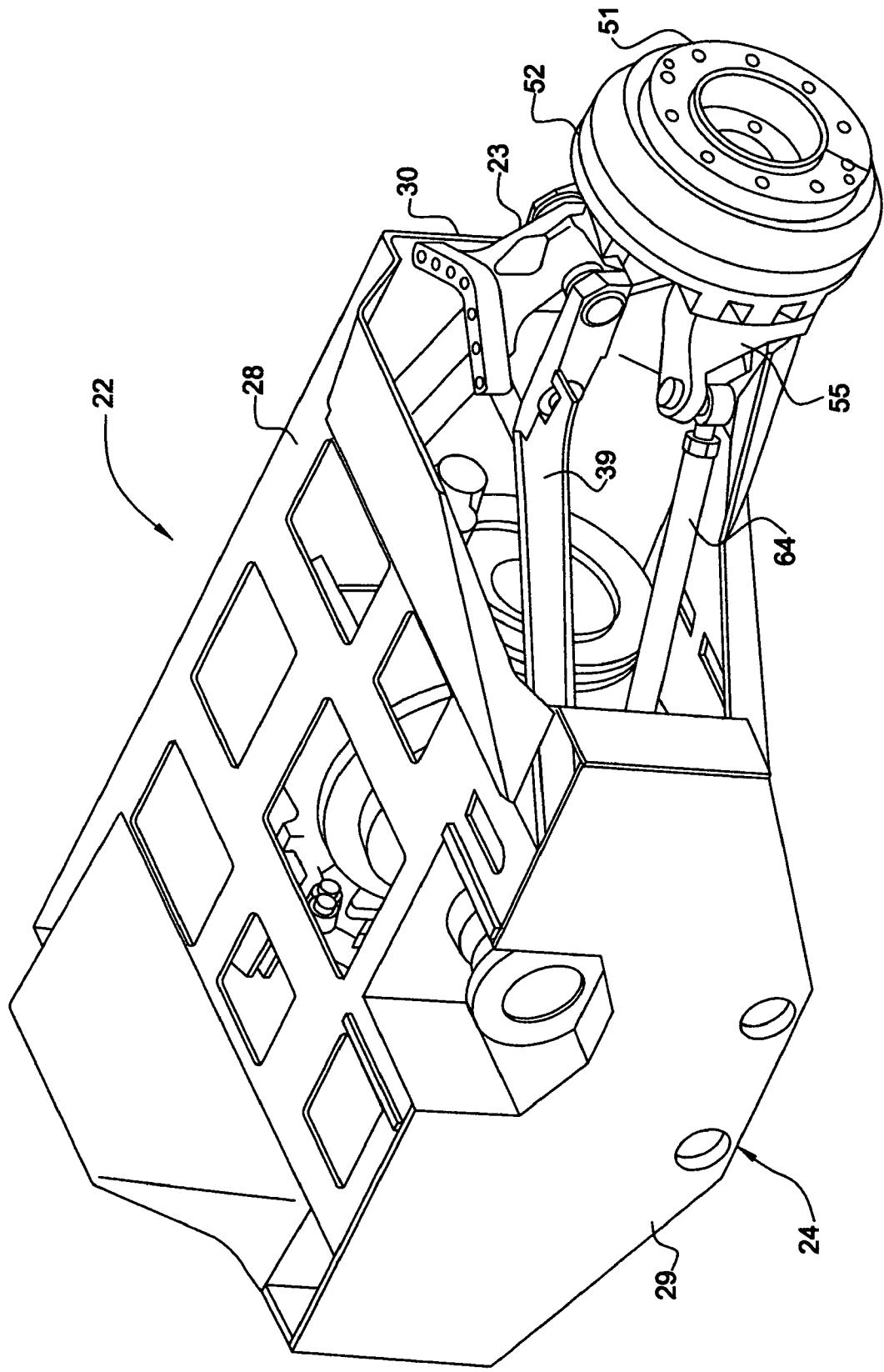
FIG. 1 is a perspective view of a wheel unit for a vehicle having certain portions thereof removed.
Figure 2:
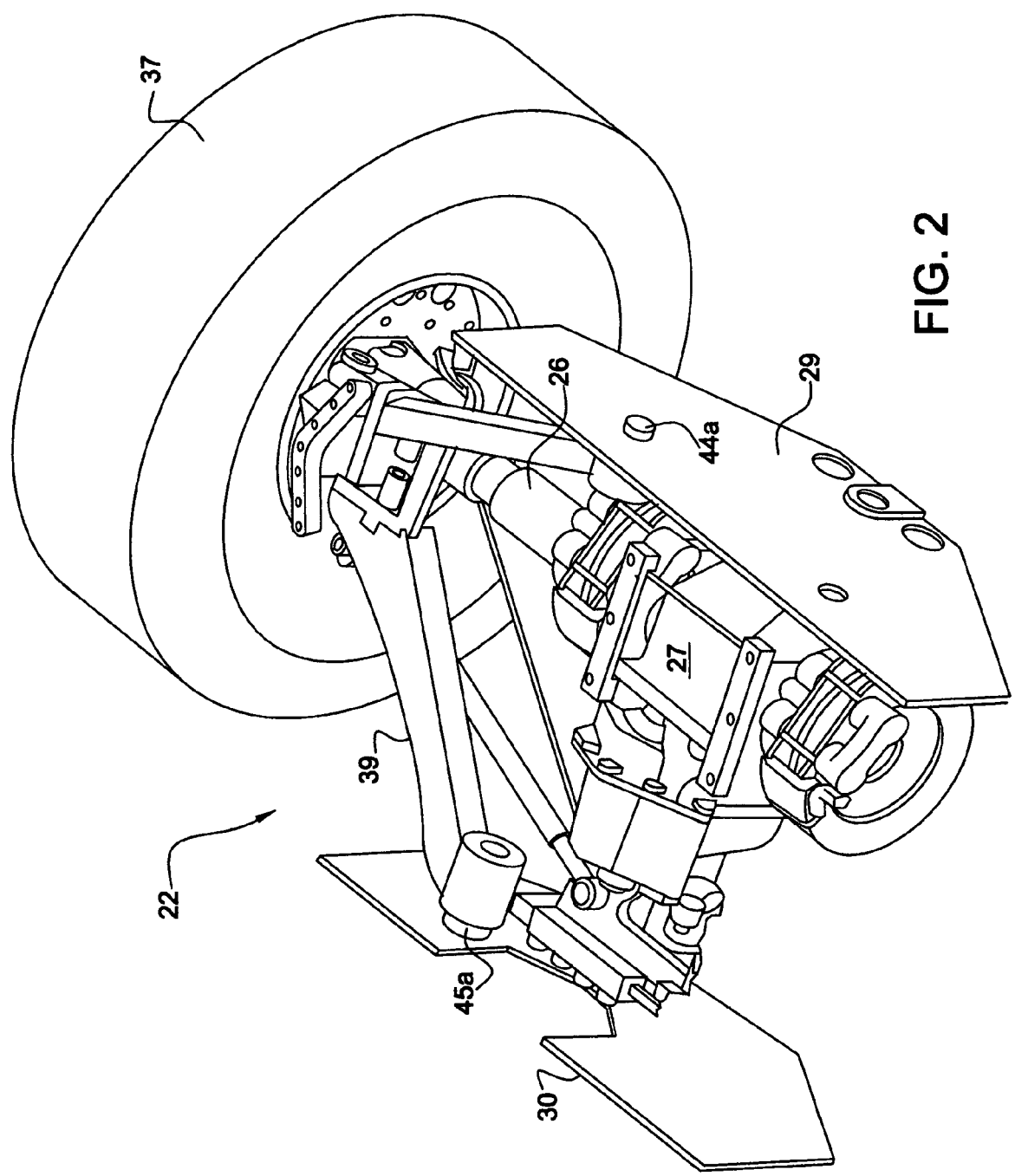
FIG. 2 is a perspective view of a portion of the wheel unit shown in FIG. 1 having portions of the support housing and the suspension system removed.

The present invention relates to an automotive vehicle generally consisting of a body mounted on a set of wheel units 22, a power plant mounted within the body, a drivetrain for transmitting drive from the power plant to the wheel units, a steering system mounted on the body and operatively connected to one or more of the wheel units and various other auxiliary equipment and systems. The vehicle may have a 4×4 configuration with one or both axles being steerable, a 6×6 configuration with the front and rear wheel units being steerable, an 8×8 configuration with one or all of the wheel units being steerable or a 10×10 configuration with one or all but the middle wheel units being steerable.

Referring to FIGS. 1 through 9, there is illustrated a wheel unit 22 generally including a suspension system 23 supported on a section 24 of the vehicle body, a wheel assembly 25 supported on the suspension system and a half axle 26 drivingly interconnecting an output shaft of a carrier 27 of the vehicle drivetrain and the wheel assembly. Body section 24 includes an upper wall member 28, a pair of longitudinally spaced, transversely disposed wall members 29 and 30 forming a transverse recess in the bottom of the hull, communicating at the ends thereof with wheel wells of the body. The lateral ends of the upper wall member 28 are angled upwardly to accommodate the angular displacement of the half shafts of the wheel units as will later be described. Carrier 27 is disposed in the bottom wall recess, on the longitudinal centerline of the vehicle and depends from and is bolted to the upper wall member 28. It includes a conventional or locking differential, a longitudinal disposed input shaft drivingly connected to the drivetrain of the vehicle, possibly an output shaft aligned with the input shaft depending upon the actual position of the unit within the vehicle and a pair of laterally projecting output shafts. In a vehicle configuration in which the wheel units are the foremost wheel units, the carrier will include only a rearwardly disposed input shaft connected to the drivetrain of the vehicle. In a configuration where the wheel units are the rearward most units of the vehicle, the carrier will have a front input shaft. In configurations where the wheel units are intermediate units, the carrier will include both longitudinally aligned input and output shafts. In the unit illustrated, the carrier includes an input shaft, a longitudinally aligned output shaft and a pair of laterally projecting output shafts.

Wheel assembly 25 is of a conventional construction including a wheel 34 having a rim portion 35 and a disc portion 36. A tire 37 is mounted on the rim portion of the wheel in the conventional manner. Half axle 26 is operatively connected at an inner end thereof to an output shaft of the carrier and is drivingly connected to the wheel unit in a manner as will be later described.

Suspension system 23 includes a lower control arm 38, an upper control arm 39, a knuckle plate 40, a support strut 41, an air spring 42 and a shock absorber. Lower control arm 38 has a substantially triangular panel configuration and is universally connected at two corners thereof to transverse wall members 29 and 30 of the vehicle body. Such panel further is dished both longitudinally and transversely so as to prevent ground matter from being thrown up onto the operating components of the unit, and further to facilitate the travel of the vehicle when the wheels become sunk in soft soil, mud, sand or water. Upper control arm 39 has a V-shaped configuration including a pair of arm sections 44 and 45 universally connected at their inner ends thereof to the transverse wall members of the vehicle hull as at 44a and 45a.

Figure 3:
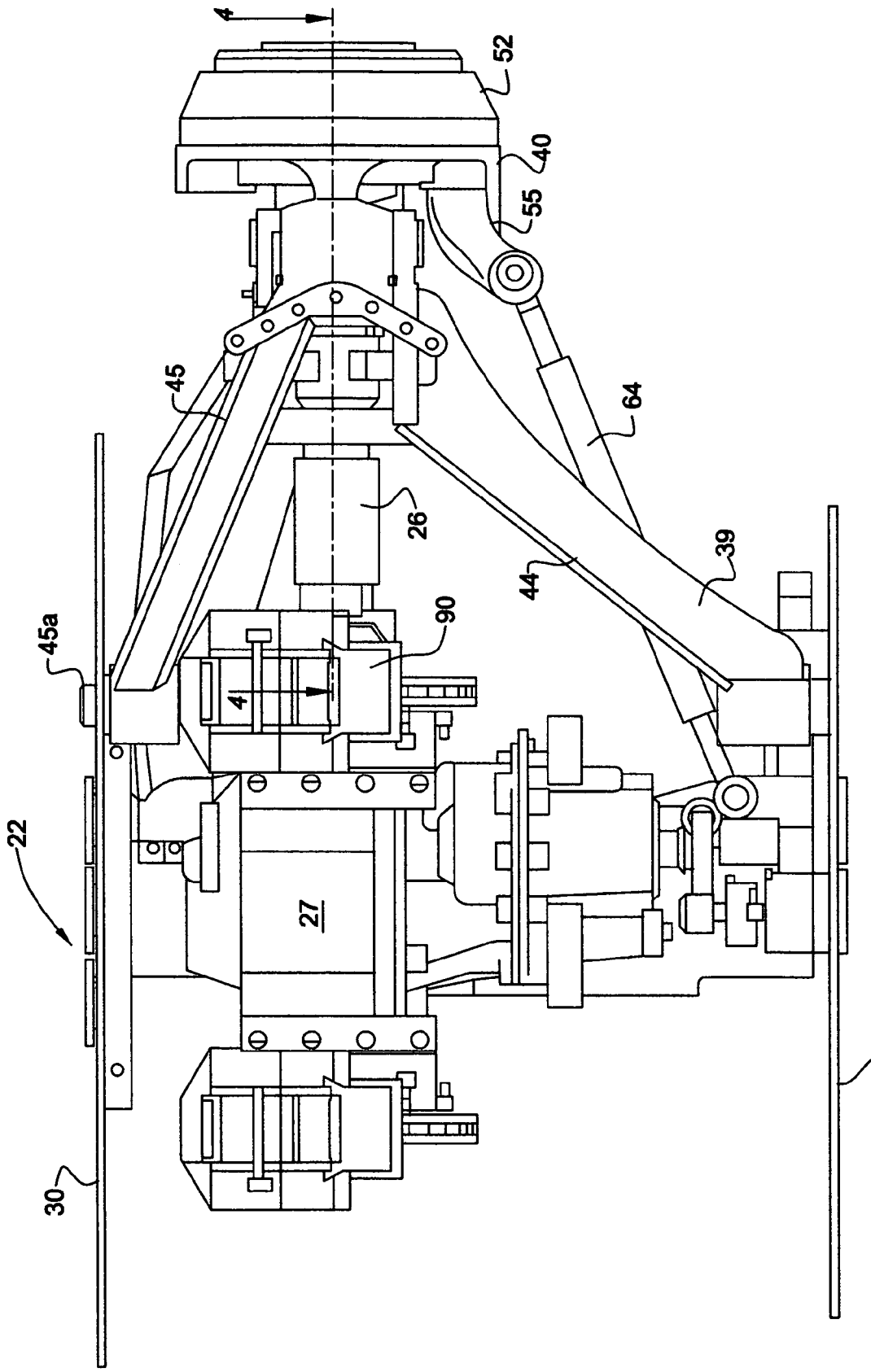
FIG. 3 is a top plan view of a portion of the wheel unit shown in FIGS. 1 and 2.
Figure 4:
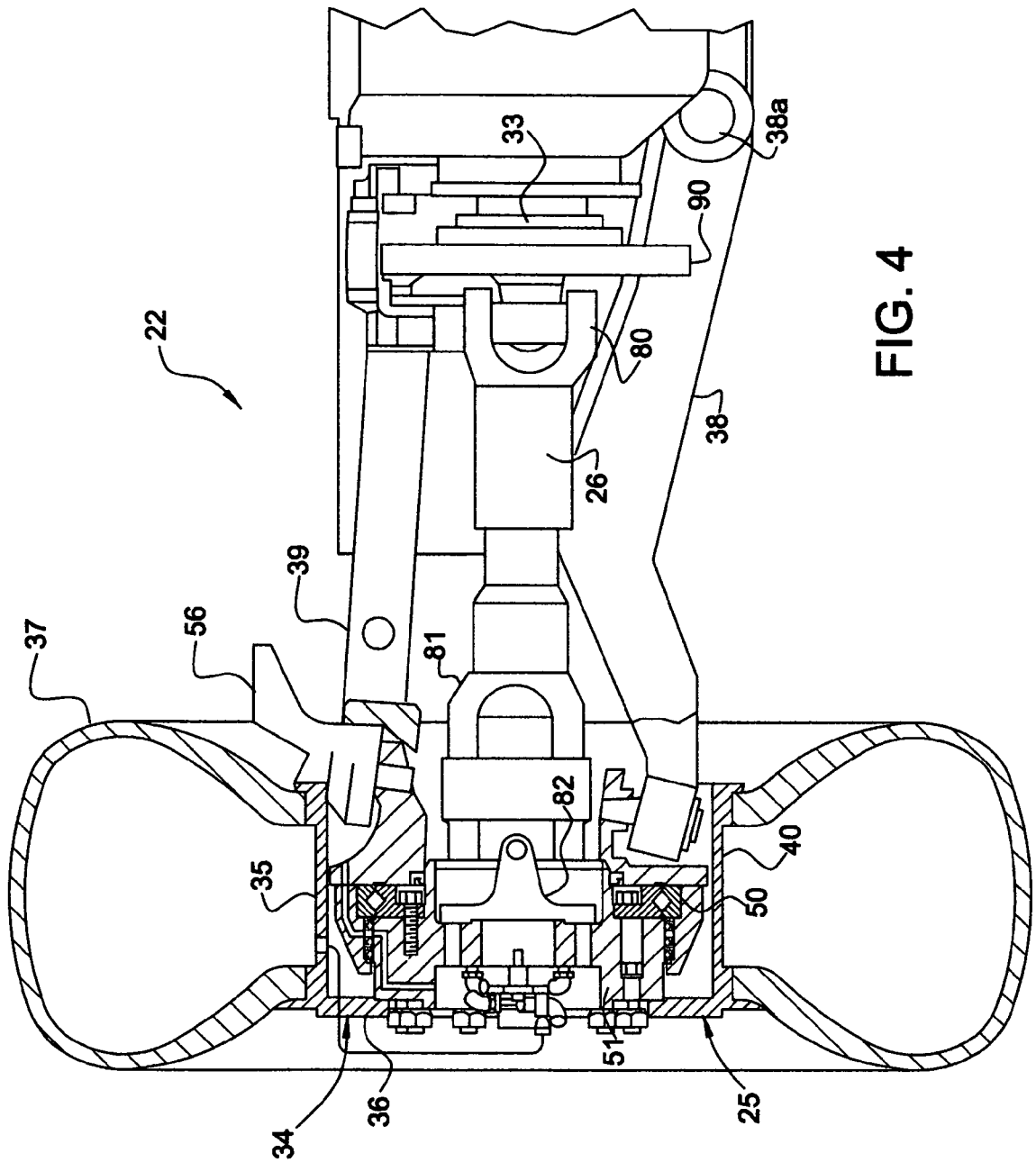
FIG. 4 is an enlarged, vertical cross-sectional view taken along line 4-4 in FIG. 3, having a tire mounted thereon.
Figure 5:
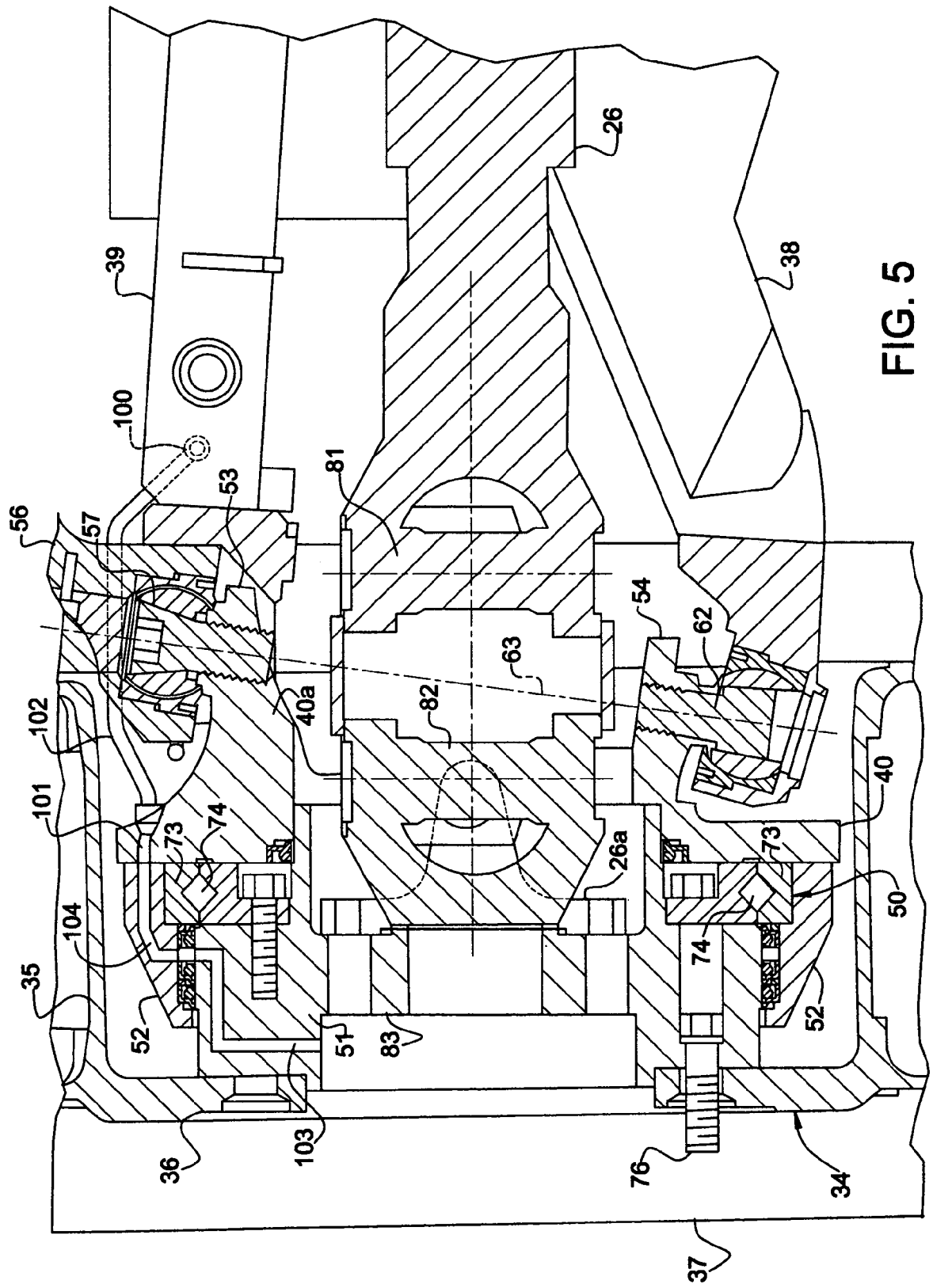
FIG. 5 is an enlarged, vertical cross-sectional view of the connection of a half axle to the wheel of the unit.

Referring to FIGS. 3 through 5, there is disposed within rim portion 35 of the wheel, an axle end assembly including knuckle plate 40, a roller bearing 50, a hub 51 and a retainer housing 52. Knuckle plate 40 has a substantially annular configuration including diametrically opposed projecting portions 53 and 54 and a knuckle bracket 55. Upper protruding portion 53 is universally connected to a mounting bracket 56 by means of a ball joint connection 57, which in turn is pivotally connected to a pair of spaced arm portions of the upper control arm by means of a set of pins having a centerline passing through the center of ball joint connection 57. Lower protruding portion 54 is universally connected to the outer end of lower control arm 38 by means of a ball joint connection 62. Ball joint connections 57 and 62 define a kingpin axis 63, at least the lower end of which is disposed within rim portion 35 of the wheel. Knuckle bracket 55 also is universally connected to the outer end of a tie rod 64. In the conventional manner, knuckle plate 40 will be caused to displace vertically relative to the body of the vehicle as the upper and lower control arms pivot about horizontal axes, and will swivel about the kingpin axis as tie rod 64 is displaced inwardly and outwardly. The inclination of the kingpin axis is at an angle in the range of 7° to 9° relative to the vertical.

Hub 51 has an annular configuration including a protruding annular portion 70. Roller bearing 50 includes an inner race 71, and outer race 73 and a set of crossed cylindrical rollers 74. The inner race receives hub portion 70 therein and is secured to the hub by means of a set of bolts 72. The outer race of the bearing is caused to be fixed to the knuckle plate and the inner race of the bearing secured to the hub is free to rotate with the hub, by means of retainer housing 52 which encompasses the bearing and hub and is secured to the knuckle plate by means of a set of bolts 75 to clamp the outer race of the bearing between the knuckle plate and the retainer housing. Hub portion 36 of wheel 34 is coaxially mounted on disc 51 by means of a set of studs 76.

Referring to FIGS. 3 through 5, half shaft 26 drivingly interconnects stub shaft 33 and hub 51. It is connected at an inner end thereof to output shaft 33 by means of a universal connection or Cardan joint 80 or a pair of Cardan joints and is provided with a pair of Cardan joints 81 and 82 adjacent the outer end thereof. Such outer end of the shaft is received through opening 40a of the knuckle plate and annular portion 70 of hub 51, and secured coaxially to the hub. The outer end of half shaft 26 is provided with an annular flange 26a which is bolted to an annular portion 83 of the hub. In such arrangement, drive is transmitted from output shaft 33 through half shaft 26 and hub 51 to wheel 34. Braking of the wheel is provided by a disc brake 90 mounted inboard on carrier 27 and operatively connected to output shaft 33. Mounting the disc brakes inwardly adjacent the carrier not only lessens upsprung mass at the wheel but results in less congestion at the wheel and facilitates access to the brake for repair and replacement without the need to remove the wheel.

The components of the axle end assembly consisting of the knuckle plate, the hub, the bearing with the outer race thereof fixed to the knuckle plate and the inner race thereof fixed to the hub and the retainer housing fixed to the knuckle plate, clamping the outer race of the bearing against the knuckle plate and encompassing the hub and bearing, are coaxially disposed and confined within the rim portion of the wheel. In addition, the kingpin axis intersects the midpoint of Cardan joints 81 and 82, and at least a lower portion of the kingpin axis also is disposed within the rim portion of the wheel. With such arrangement, the outer end of the half shaft is free to displace vertically and angularly about the kingpin axis to permit the vehicle to traverse irregular and sloped terrain and steer while transmitting drive and braking to the wheel.

The roller bearing functions to carry axial, radial and moment loads. In the embodiment shown in FIGS. 1 through 8, it is provided with raceways in the inner and outer races thereof which are inclined at an angle of 45° relative to the axis of the bearing, between which the cylindrical rollers are arranged alternately at 90° to each other. The diameter of the rollers is larger than their length. Such bearing is functional to accommodate radial and axial loads acting in both directions, and also tilting moments.

Alternatively to the axle end assembly shown in FIG. 7 utilizing a crossed cylindrical roller bearing, an assembly as shown in FIG. 7a may be used utilizing a pair of tapered bearings. Such assembly includes a knuckle plate 40' comparable to knuckle plate 40, a hub 51a comparable to hub 51, having an annular portion 70a receivable within the opening in the knuckle plate, a pair of tapered roller bearings 50a and 50b separated by a spacer 50c and having the inner races thereof mounted on an annular outer surface of the hub with the inner race of bearing 50a engaging a shoulder provided on the hub, and an annular retainer housing 52a encompassing hub 51a and bearings 50a and 50b, engaging the outer race of bearing 50a and secured to knuckle plate 40' by means of a set of bolts. The clamping action of retainer housing 52a functions to maintain the outer races of bearings 50a and 50b fixed to the knuckle plate while permitting the inner races thereof to rotate with the hub. The inner races of bearings 50a and 50b are secured to hub 51a by a nut 51b. As in the assembly shown in FIG. 7, the outer end of a half shaft 26a is disposed coaxially with and secured to hub 51a by means of a set of bolts. In operation, the assembly shown in FIG. 7a functions in the same manner as the assembly shown in FIG. 7 with the knuckle plate being free to displace vertically and swivel about the kingpin axis, and the half shaft transmitting drive through hub 51a to a wheel mounted thereon in the manner as previously described.

Figure 9:
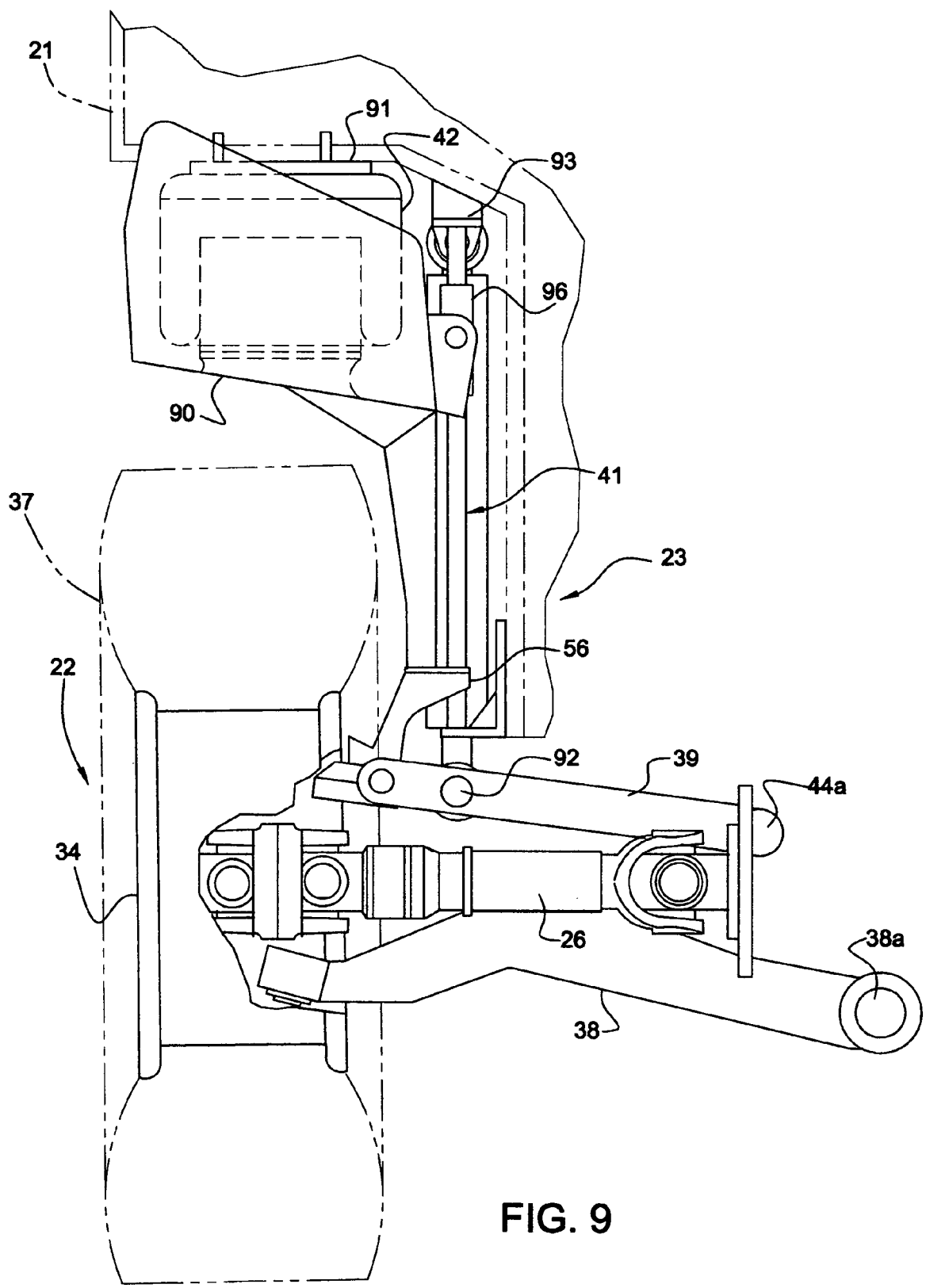
FIG. 9 is a side elevational view of the wheel unit including components of the suspension system.

As best seen in FIG. 9, support strut 41 is rigidly connected at the lower end thereof to mounting bracket 56 and is provided at an upper end thereof with a laterally projecting support ledge section 90 on which air spring 42 is seated and rigidly attached. The air spring is of a conventional construction and includes an upper plate member 91 which is bolted, welded or otherwise rigidly secured to the underside of the vehicle body within the wheel well. The associated shock absorber also is of a conventional construction, pivotally connected at a lower end thereof to a connecting pin 92 in the upper control arm and pivotally connected at an upper end thereof to a bracket 93 rigidly secured to the underside of the vehicle body within the wheel well. Also connected at their upper ends to attachment plate 93 is a set of rods disposed parallel to the piston portion of the shock absorber and guided in a set of bushings supported on support strut 41. To protect the air spring, support ledge 90 is provided with a curved guard having a sufficient height to completely shield the air spring when the air spring is in an onroad condition as shown in FIG. 9.

To assemble the wheel unit as described, with the body of the vehicle sufficiently elevated, the inner ends of the upper and lower control arms are first connected to the vehicle and the half shaft is connected to the output shaft of the carrier. With mounting bracket 56 mounted on the upper control arm, support strut 41 with air spring 42 mounted thereon is inserted in the wheel well, the lower end of the support strut is bolted to mounting bracket 56 and upper plate 91 of the air spring is bolted to the vehicle. The shock absorber is then connected between the upper control arm and the underside of the vehicle within the wheel well. Knuckle plate 40 is then inserted into the wheel well and connected to the upper and lower control arms, allowing the free end of the half shaft to be received through the opening in the knuckle plate. Roller bearing 15 is then mounted on hub 51 and hub 51 with bearing 50 mounted thereon is placed within the wheel well and mounted in the knuckle plate. The hub and bearing thus installed are secured in position by mounting the retainer housing and securing it to the knuckle plate so that the outer race of the bearing will be interposed between the retainer housing and the knuckle plate and the inner race of the bearing will be secured to the hub for rotation therewith. The outer end of the half shaft then is secured to the hub by bolting end flange 26a to the annular portion of the hub. Wheel 34 may then be positioned coaxially against the exposed end of hub 51 and secured thereto by means of a set of bolts 76. Assuming the wheel unit is a steerable unit, the installation of the unit would be completed by connecting the knuckle bracket of the knuckle plate to tie rod 64 of the steering system of the vehicle.

For traversing different terrain and also for operating the vehicle on soft ground, it often is desirable to be able to vary the amount of inflation of the tires of the vehicle. For this purpose, a fluid passageway is provided intercommunicating a source of air under pressure on the body of the vehicle and each of the tires of the vehicle. With respect to the wheel unit described, such passageway includes a passageway in upper control arm 39 communicating with a fixture 100 mounted on the outer, upper end of the upper control arm, a passageway 101 in knuckle plate 40, a hose 102 intercommunicating fixture 100 and passageway 101, an annular groove and a passageway 103 in hub 51, a passageway 104 intercommunicating passageways 101 and 103, a valve communicating with passageway 103, and a hose intercommunicating such valve and a port in the rim portion of the wheel communicating with the interior of the tire. Such valve is of a type that may be actuated to open or close by transmitting bursts of air through the passageway as described. Suitable controls are provided in such passageway to supply air under pressure to inflate such tires and to vent such passageway to deflate the tire. Because of their positioning, such passageways can be larger than comparable passageways in prior art vehicles and thus are capable of providing larger volumes of air for faster reaction times.

By supporting the wheel on the half shaft at a point further from the longitudinal centerline of the vehicle than conventionally mounted wheels on axle spindles, greater vertical displacement of the wheel is achieved without greatly increasing the angularity of the half shaft. Accordingly, increased wheel travel is provided without the half shaft unduly intruding upon the hull of the vehicle and correspondingly diminishing the compartment space within the vehicle. Such arrangement further provides less intrusion of the wheels into the hull when the wheels are turned when steering. Typically, the wheels will swivel in an arc of about 26°.

Figure 10:
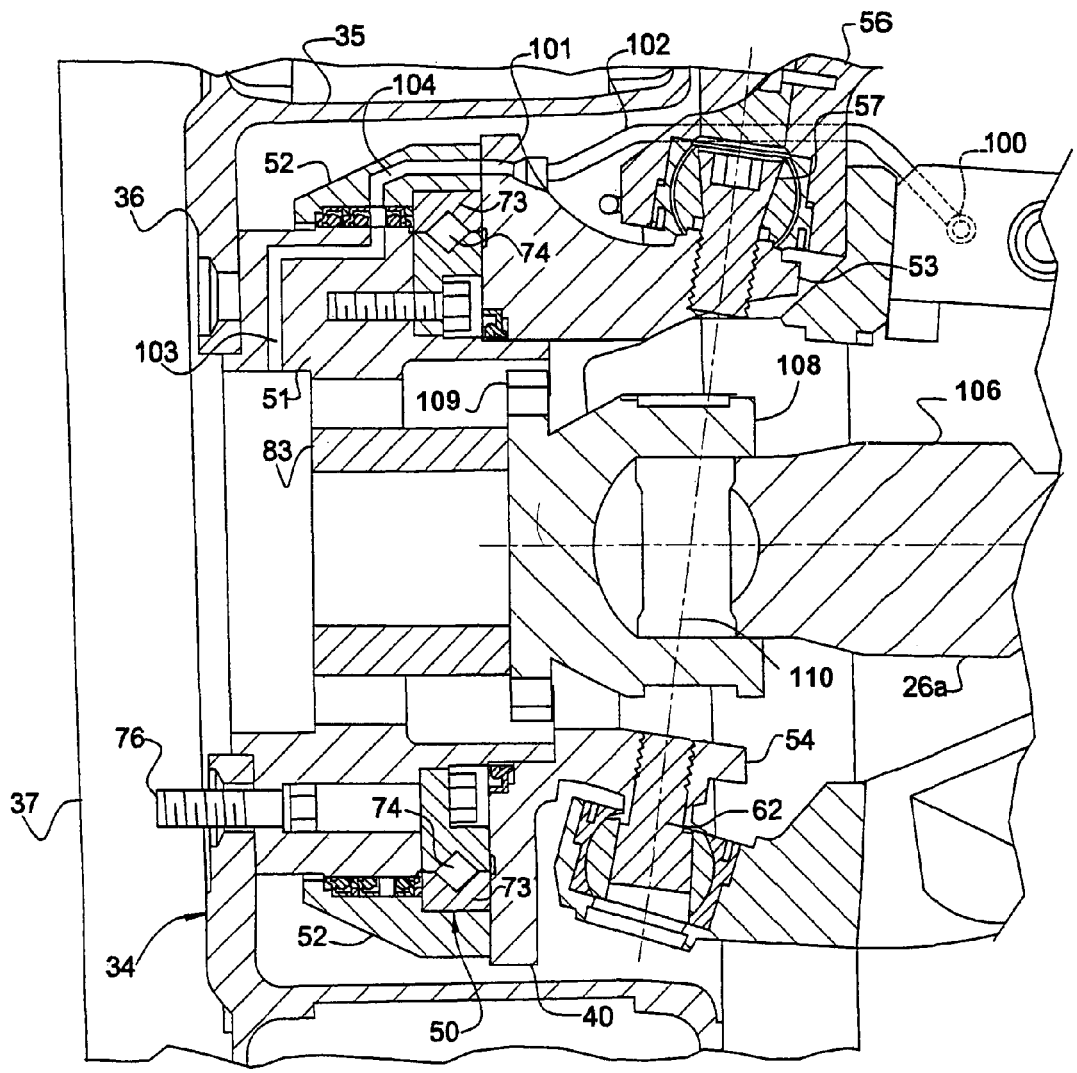
FIG. 10 is a view similar to the view shown in FIG. 5, illustrating another embodiment of the invention.
Figure 11:
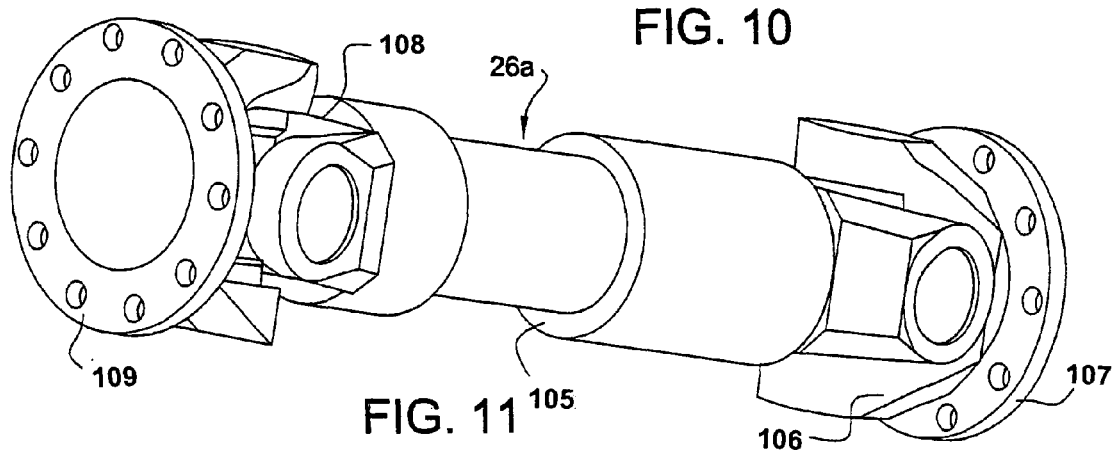
FIG. 11 is a perspective view of a half axle forming a portion of the embodiment shown in FIG. 10.

Referring to FIGS. 10 and 11, there is illustrated a further embodiment of the invention. This embodiment is similar to the embodiment shown in FIGS. 1 through 9 except for the configuration of the outer end of the half axle connected to the hub portion of the wheel assembly. Essentially, the outer end of the half axle consists of a single Cardan or universal joint in lieu of a pair of Cardan or universal joints, having the steering axis of the assembly intersecting the center of the single universal joint. The embodiment includes a half axle 26a as shown in FIG. 11, having a shaft portion 105 provided with a single universal joint 106 at the inner end thereof provided with a mounting flange 107, and a single universal joint 108 at the outer end thereof provided with a mounting flange 109. As best seen in FIG. 10, when the outer end of the axle is connected to the hub of the wheel assembly, a portion of single universal joint 108 will be received within the rim of the wheel and steering axis 110 will pass through the center of universal joint 108. The lower end of the steering axis also will be within the rim of the wheel.

Although the described embodiments of the wheel unit assembly may be particularly suitable for mounting on a platform consisting of a hull of monocoque construction, it is to be understood that the assembly is not limited to installation on such a platform and can be mounted on any desired platform. The platform may have any configuration depending upon its use requiring a wheel assembly having an independent suspension. The platform may consist of a conventional truck including a main frame, a cab mounted on the front end thereof and a body mounted on the frame behind the cab. The platform further may consist of a main frame and a cab and a flat bed mounted on the frame with or without a variety of implements mounted on the flat bed. In addition, although the invention has been described in connection with a platform consisting of a hull of monocoque construction having a specific design, such hull may consist of any suitable design.

From the foregoing detailed description, it will be evident that there are a number of changes, adaptations, and modifications of the present invention which come within the province of those persons having ordinary skill in the art to which the aforementioned invention pertains. However, it is intended that all such variations not departing from the spirit of the invention be considered as within the scope thereof as limited solely by the appended claims.

We claim:

1. A wheel assembly for a vehicle having a body, a power plant and a drivetrain for transmitting drive to said wheel assembly, comprising:

a wheel including rim and hub portions;

a single roller bearing having inner and outer races, disposed within said rim portion of said wheel, coaxially with said rim portion;

first support means having a steering axis, immovably fastened to said outer race of said bearing, connectable to said body;

second support means immovably fastened to said inner race of said bearing and rigidly secured to said hub portion of said wheel; and an axle operatively connected at an inner end thereof to a portion of said drive train and having an outer end extending into the inner race of said bearing and immovably fastened by means of a single universal joint to one of said second support means and said hub portion of said vehicle.

2. An assembly according to claim 1 wherein said bearing is provided with a set of cylindrical rollers.

3. An assembly according to claim 1 wherein said single universal joint is disposed within said rim portion of said wheel.

4. An assembly according to claim 1 wherein the inner end of said axle is connected to said portion of said drivetrain with a universal connection.

5. An assembly according to claim 1 wherein said first support means includes a support member mounted on the outer race of said bearing, a lower control arm pivotally connectable at one end to a first portion of said body and connected by means of a universal joint at the other end thereof to said support member, and an upper control arm pivotally connectable to a second portion of said body and universally connected by means of a universal joint at the other end thereof to said support member, defining said steering axis intersecting the rotational axis of said wheel.

6. An assembly according to claim 5 wherein a portion of said steering axis is disposed within said rim portion of said wheel.

7. An assembly according to claim 6 wherein said steering axis is inclined at an angle in the range of 7° to 9° relative to the vertical.

8. An assembly according to claim 5 wherein said connections of said upper and lower control arms to said support member comprise ball joint connections and wherein said steering axis intersects the centers of the ball portions thereof.

9. An assembly according to claim 5 wherein said lower control arm comprises a panel.

10. An assembly according to claim 9 wherein said panel has a triangular configuration.

11. An assembly according to claim 5 including a spring interposed between said upper control arm and said body.

12. An assembly according to claim 11 including a shock absorber cooperable with said spring.

13. An assembly according to claim 5 including an air spring disposed between said upper control arm and said body.

14. An assembly according to claim 13 including a bracket pivotally connected to said upper control arm, and wherein said air spring is interposed between said bracket and said body.

15. An assembly according to claim 1 wherein said first and second support means and said wheel include a passageway intercommunicating a source of air pressure on said body and a tire mounted on said wheel.

16. An assembly according to claim 1 including a gearbox comprising a portion of said drivetrain, supported on said body, and wherein said axle is connected to an output shaft of said gearbox through a universal connection.

17. An assembly according to claim 16 including a disc brake operatively connected to said output shaft.

18. An assembly according to claim 16 wherein said gearbox includes longitudinally aligned input and output shafts.

* * * * *